(12) United States Patent
Yoda

(10) Patent No.: US 9,369,594 B2
(45) Date of Patent: Jun. 14, 2016

(54) TRANSMISSION DEVICE, RELAY DEVICE, RECORDING MEDIUM AND CONTROL METHOD OF TRANSMISSION SYSTEM

(71) Applicant: FUJITSU LIMITED, Kawasaki-shi, Kanagawa (JP)

(72) Inventor: Kazushi Yoda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 38 days.

(21) Appl. No.: 14/288,429

(22) Filed: May 28, 2014

(65) Prior Publication Data

US 2014/0362418 A1     Dec. 11, 2014

(30) Foreign Application Priority Data

Jun. 6, 2013   (JP) ................................. 2013-120247

(51) Int. Cl.
  *G06F 3/12* (2006.01)
  *H04N 1/00* (2006.01)
  *H04N 1/32* (2006.01)

(52) U.S. Cl.
  CPC ....... *H04N 1/00363* (2013.01); *H04N 1/00374* (2013.01); *H04N 1/00376* (2013.01); *H04N 1/00379* (2013.01); *H04N 1/00968* (2013.01); *H04N 1/32133* (2013.01); *H04N 2201/3269* (2013.01); *H04N 2201/3271* (2013.01)

(58) Field of Classification Search
  None
  See application file for complete search history.

(56) References Cited

U.S. PATENT DOCUMENTS

| 4,249,216 | A | * | 2/1981 | Kanda | 379/100.14 |
| 4,642,697 | A | * | 2/1987 | Wada | 358/439 |
| 6,018,816 | A | * | 1/2000 | Tateyama | 714/746 |
| 6,027,200 | A | * | 2/2000 | Takahashi et al. | 347/19 |
| 6,149,257 | A | * | 11/2000 | Yanaka et al. | 347/9 |

(Continued)

FOREIGN PATENT DOCUMENTS

| JP | 2000-332939 | 11/2000 |
| JP | 2006-180342 | 7/2006 |
| JP | 2008-113125 | 5/2008 |

*Primary Examiner* — Madelein Nguyen
(74) *Attorney, Agent, or Firm* — Fujitsu Patent Center

(57) ABSTRACT

A transmission device includes an obtainment unit configured to obtain a fax number of a relay device and transmission destination information that determines a transmission destination; a scanner unit configured to scan a script of a transmission target so as to generate image data of the script; and a processor configured to execute a process including: generating a command for transmitting the image data to the transmission destination by using the obtained transmission destination information; converting each character constituting the command into a binary number; adding, to the image data, dot data represented by a dot that corresponds to the binary number; and transmitting the image data to which the dot data has been added, to the relay device via fax communication.

9 Claims, 15 Drawing Sheets

(56) References Cited

U.S. PATENT DOCUMENTS

| | | | |
|---|---|---|---|
| 6,760,119 B1* | 7/2004 | Silverbrook et al. | 358/1.15 |
| 6,801,332 B1* | 10/2004 | Suga et al. | 358/1.15 |
| 7,558,983 B2* | 7/2009 | Tanimoto | 714/18 |
| 7,627,118 B2* | 12/2009 | Kanai | G06F 21/608 380/203 |
| 7,787,155 B2* | 8/2010 | Taniguchi | H04L 12/5875 358/1.13 |
| 8,115,965 B2* | 2/2012 | Yokokura | H04N 1/00222 358/3.28 |
| 8,208,179 B2* | 6/2012 | Ishikawa | H04N 1/32149 283/72 |
| 8,224,019 B2* | 7/2012 | Fan | G06F 17/2294 283/113 |
| 8,335,014 B2* | 12/2012 | Muramatsu | H04N 1/6033 358/1.13 |
| 8,373,895 B2* | 2/2013 | Fan | H04N 1/32203 358/1.15 |
| 8,411,328 B2* | 4/2013 | Tsuchitoi | G03G 21/04 283/113 |
| 8,416,462 B2* | 4/2013 | Ishii | G06T 1/0021 358/1.15 |
| 8,467,078 B2* | 6/2013 | Aritomi | H04N 1/00912 358/1.14 |
| 8,730,007 B2* | 5/2014 | Otake | G06F 21/608 340/5.82 |
| 2003/0020936 A1* | 1/2003 | Nakajima et al. | 358/1.9 |
| 2003/0231785 A1* | 12/2003 | Rhoads et al. | 382/100 |
| 2004/0125402 A1* | 7/2004 | Kanai | G06F 21/608 358/1.15 |
| 2009/0009794 A1* | 1/2009 | Morikawa | G06F 21/608 358/1.15 |
| 2009/0059308 A1* | 3/2009 | Tanaka | G03G 21/043 358/3.29 |
| 2009/0174893 A1* | 7/2009 | Fujii | G03G 15/5029 358/1.15 |
| 2009/0207434 A1* | 8/2009 | Tanaka | H04N 1/00854 358/1.14 |
| 2009/0254572 A1* | 10/2009 | Redlich et al. | 707/10 |
| 2011/0043852 A1* | 2/2011 | Uejo | G06F 3/1222 358/1.15 |
| 2011/0170133 A1* | 7/2011 | Kurilin | G06K 15/1889 358/1.15 |
| 2011/0292413 A1* | 12/2011 | Crean | 358/1.9 |
| 2011/0292445 A1* | 12/2011 | Kato | G06F 3/1222 358/1.15 |
| 2012/0113463 A1* | 5/2012 | Nogawa et al. | 358/1.15 |
| 2012/0243009 A1* | 9/2012 | Chapman | H04N 1/54 258/1.9 |
| 2012/0282587 A1* | 11/2012 | Lofthus | G09B 3/00 434/335 |
| 2015/0043032 A1* | 2/2015 | Kyojima | G06F 3/0321 358/1.15 |

\* cited by examiner

COMMAND CHARACTER STRING

Forward to e-mail:abc@xx.yy.zz

F I G. 3 A

HEXADECIMAL CODE EXPRESSION OF COMMAND CHARACTER STRING (WHEN CHARACTER CODE USED=Shift-JIS)

0x46, 0x6F, 0x72, 0x77, 0x61, 0x72, 0x64, 0x20, 0x74, 0x6F, 0x20, 0x65, 0x2D, 0x6D, 0x61, →(A)

(A)→ 0x69, 0x6C, 0x3A, 0x61, 0x62, 0x63, 0x40, 0x78, 0x78, 0x2E, 0x79, 0x79, 0x2E, 0x7A, 0x7A

F I G. 3 B

DOT EXPRESSION FOR EACH CHARACTER OF COMMAND CHARACTER STRING
(CORRESPONDS TO BINARY NUMBER)

| NO. | CHARACTER | HEXADECIMAL | BINARY | DOT EXPRESSION |
|---|---|---|---|---|
| 01 | F | 0x46 | 01000110 | ○●○○○●●○ |
| 02 | o | 0x6F | 01101111 | ○●●○●●●● |
| 03 | r | 0x72 | 01110010 | ○●●●○○●○ |
| 04 | w | 0x77 | 01110111 | ○●●●○●●● |
| 05 | a | 0x61 | 01100001 | ○●●○○○○● |
| 06 | r | 0x72 | 01110010 | ○●●●○○●○ |
| 07 | d | 0x64 | 01100100 | ○●●○○●○○ |
| 08 |   | 0x20 | 00100000 | ○○●○○○○○ |
| 09 | t | 0x74 | 01110100 | ○●●●○●○○ |
| 10 | o | 0x6F | 01101111 | ○●●○●●●● |
| 11 |   | 0x20 | 00100000 | ○○●○○○○○ |
| 12 | e | 0x65 | 01100101 | ○●●○○●○● |
| 13 | - | 0x2D | 00101101 | ○○●○●●○● |
| 14 | m | 0x6D | 01101101 | ○●●○●●○● |
| 15 | a | 0x61 | 01100001 | ○●●○○○○● |
| 16 | i | 0x69 | 01101001 | ○●●○●○○● |
| 17 | l | 0x6C | 01101100 | ○●●○●●○○ |
| 18 | : | 0x3A | 00111010 | ○○●●●○●○ |
| 19 | a | 0x61 | 01100001 | ○●●○○○○● |
| 20 | b | 0x62 | 01100010 | ○●●○○○●○ |
| 21 | c | 0x63 | 01100011 | ○●●○○○●● |
| 22 | @ | 0x40 | 01000000 | ○●○○○○○○ |
| 23 | x | 0x78 | 01111000 | ○●●●●○○○ |
| 24 | x | 0x78 | 01111000 | ○●●●●○○○ |
| 25 | . | 0x2E | 00101110 | ○○●○●●●○ |
| 26 | y | 0x79 | 01111001 | ○●●●●○○● |
| 27 | y | 0x79 | 01111001 | ○●●●●○○● |
| 28 | . | 0x2E | 00101110 | ○○●○●●●○ |
| 29 | z | 0x7A | 01111010 | ○●●●●○●○ |
| 30 | z | 0x7A | 01111010 | ○●●●●○●○ |

F I G. 3 C

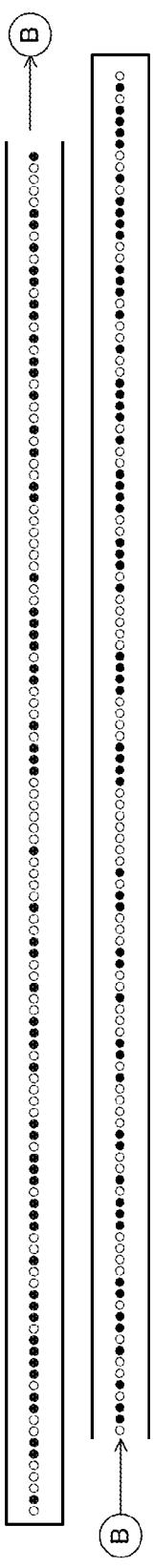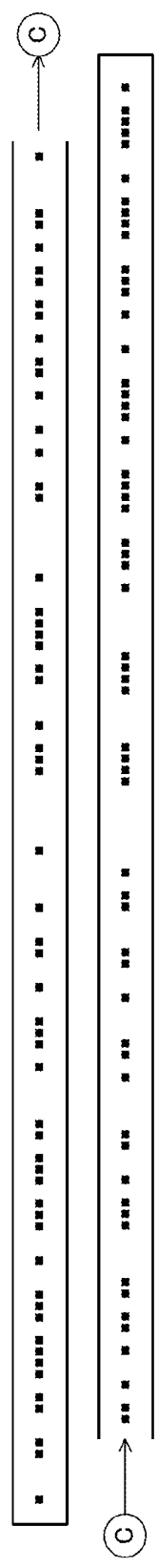
FIG. 3D

| COMMAND CHARACTER STRING ||
|---|---|
| COMMAND CHARACTER (CHARACTER STRING) | COMMAND PARAMETER (CHARACTER STRING) |

F I G. 6 A

| COMMAND CHARACTER | MEANING |
|---|---|
| Forward to e-mail: | TRANSMIT SCRIPT VIA ELECTRONIC MAIL USING COMMAND PARAMETER AS ADDRESS |
| Forward to fax: | TRANSMIT SCRIPT VIA FAX TRANSMISSION USING COMMAND PARAMETER AS FAX NUMBER |

F I G. 6 B

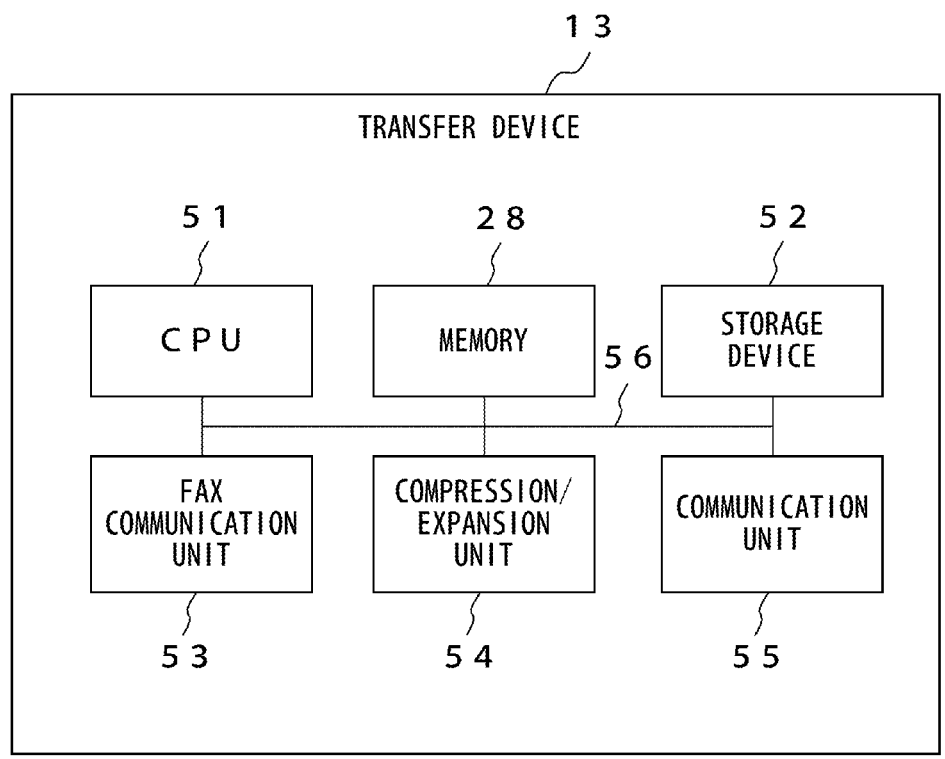
F I G. 9

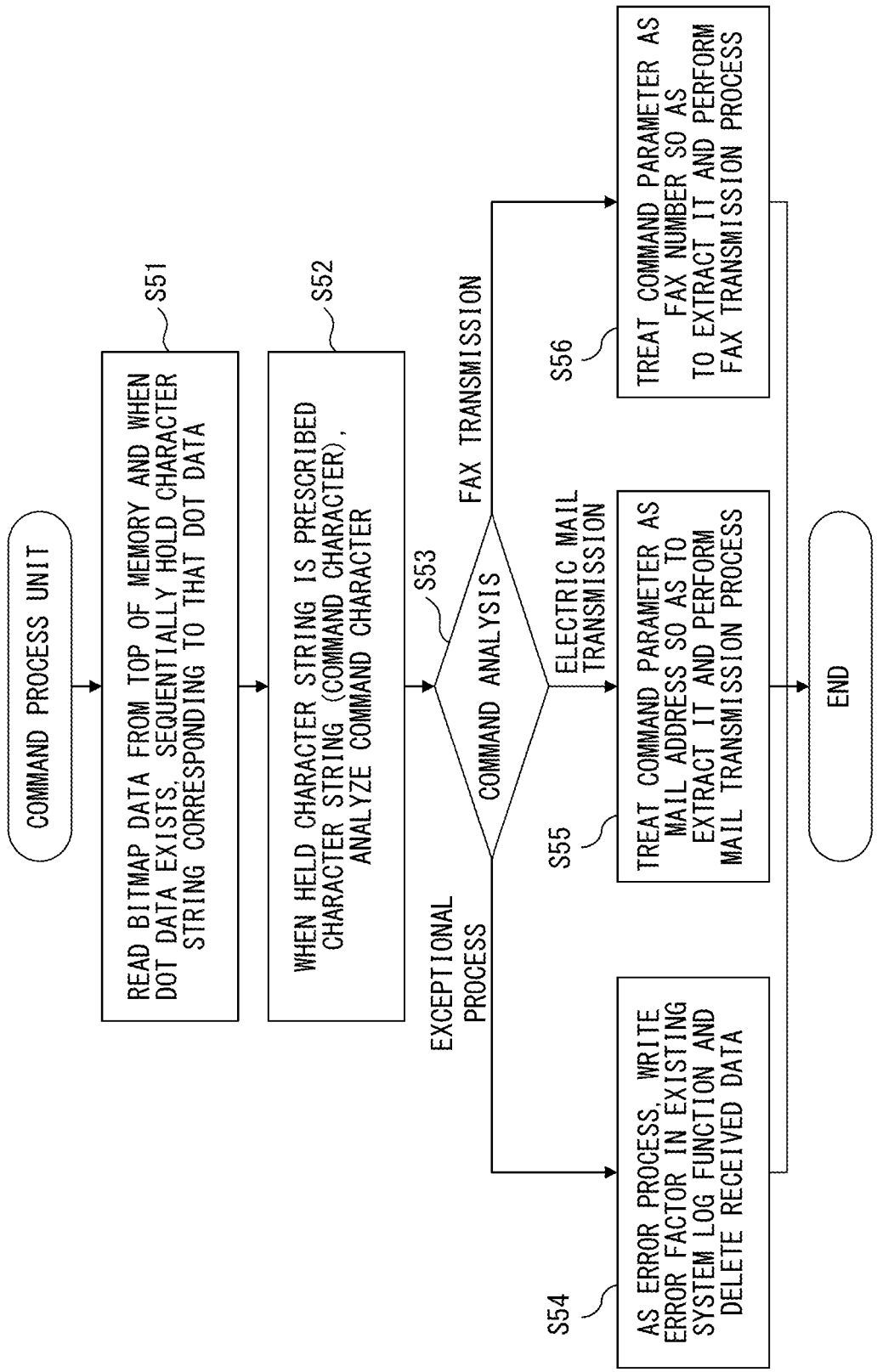
F I G. 11

TRANSMISSION DEVICE, RELAY DEVICE, RECORDING MEDIUM AND CONTROL METHOD OF TRANSMISSION SYSTEM

CROSS-REFERENCE TO RELATED APPLICATION

This application is based upon and claims the benefit of priority of the prior Japanese Patent Application No. 2013-120247, filed on Jun. 6, 2013, the entire contents of which are incorporated herein by reference.

FIELD

The embodiments discussed herein are related to transmission of data.

BACKGROUND

A fax protocol (G3-fax) recommended by ITU-T (International Telecommunication Union-Telecommunication sector) is a protocol for transmitting a script in the form of electronic data to a fax number and thereafter transmitting it as image data. Fax protocols are widely used around the world from household fax machines to combined-type fax machines used for business (referred to as "fax devices" hereinafter).

In recent years, there have been transfer routes that not only print/output data transmitted from a fax device to a sheet in a transmission destination but also convert image data into an electronic mail and transmit it to a device that can transmit and receive electronic mails (referred to as a PC hereinafter), or transfer routes that transmit it from a PC to a fax.
(1) Transmission from fax device to fax device
(2) Transmission from fax device to PC
(3) Transmission from PC to fax device Also, as output media, there are not only paper or display devices but also storage in category folders of a computer as electronic files.

Regarding the implementation of (2) and (3) above, it is not practical to change fax protocols that have already been widely used by public circuits. As a method for implementing for example (2) in an external mechanism without changing fax protocols, there is a transfer service system of a telecommunication carrier that converts fax data into electronic mails so as to transmit them.

According to the transfer service system, a transmission side registers beforehand in a transfer service system a fax number to which a transmission destination code has been added or an electronic mail address to which a transmission destination code has been added. The transmission destination code and the fax number/electronic mail address are associated and registered in a correspondence table. A fax number to which a transmission destination code has been added and an electronic mail address to which a transmission destination code has been added are referred to as transmission destination information. The transmission side dials the telephone number of the transfer service system and subsequently dials the above transmission destination code so as to perform fax transmission of a target script to the transfer service system. The transfer service system receives the target transfer information transmitted through fax, and obtains the transmission destination information corresponding to the dialed transmission destination code from the correspondence table. The transfer service system transmits the target script information to the actual reception destination in accordance with the transmission method in the transmission destination information (fax of electronic mail).

However, in the output destination conversion into an electronic mail in the transfer service system, pre-registration operations in the transfer service system are necessary, leading to troublesome procedures and a possibility of consuming time before transmission. Also, a number to be dialed consists of a fixed number and a transmission destination code, which are not related to the number or the address of the actual reception destination, leading to a possibility of having trouble in the checking of transmission confirmation.

As a technique for avoiding the troublesome pre-registration above, there is a first technique that adds transfer information to a transmission image itself so as to control it. In this first technique, a digital copy device extracts embedded image data of an embedded image that has been embedded beforehand in an image of a script from the image data of the script that was read and generated by a reading unit. The digital copy device analyzes an image process command included in the embedded image from the extracted embedded image data and obtains an image process content executed on the script image data. The digital copy device executes the image process on the script image data on the basis of the obtained image process content. According to the first technique, as an image process command, a transmission destination command represented by the mail address of the transmission destination and an output image process command are in the form of a two-dimensional barcode.

Also, there are other techniques related to data transmission as below.

In the second technique, an image forming device includes a network IF (interface), an image reading unit, an image forming unit, and a CPU (Central Processing Unit). The network IF communicates with other computers. The image reading unit reads scripts and outputs image data. The image forming unit receives inputs of image data and forms an image on a recording medium. The CPU includes an electronic mail process unit, encoding/decoding process unit, and an intermediate image generation unit. The electronic mail process unit obtains the header portion of an electronic mail when an electronic mail containing data has been received from a different computer through the network IF. The encoding/decoding process unit encodes the header portion and outputs a barcode. The intermediate image generation unit outputs, to the image forming unit, an intermediate image obtained by synthesizing the data and the barcode. Also, the encoding/decoding process unit decodes a barcode included in image data obtained by reading a script so as to obtain the header portion. The electronic mail process unit transmits the image to a transmission destination specified by the header portion. Thereby, data and information related to the data are associated even while recoding media change.

Also, according to the third technique, a printing system includes clients that are connected to the same network to transmit data and a printing device that is connected to a public circuit to perform printing of data from the clients. A client includes application software, a printer driver, and a communication unit. The application software generates a transmission script. The printer driver controls operations of the printing device. The communication unit performs data transmission and data reception with the printing device through the network. The printing device includes a communication unit, a command analysis unit, a printing unit, a data conversion unit, and a facsimile transmission unit. The communication unit receives data from a client. The command analysis unit analyses received data. The printing unit prints data on sheets of paper. The data conversion unit converts print data into facsimile transmission data. The facsimile transmission unit performs facsimile transmission of facsimile transmission data. Thereby, printing and facsimile transmission can be performed in a simple manner.

Patent Document 1: Japanese Laid-open Patent Publication No. 2008-113125

Patent Document 2: Japanese Laid-open Patent Publication No. 2006-180342

Patent Document 3: Japanese Laid-open Patent Publication No. 2000-332939

SUMMARY

A transmission device according to an aspect of the embodiments includes an obtainment unit, a scanner unit, an addition unit, and a transmission unit. The obtainment unit obtains a fax number of a relay device and transmission destination information that determines a transmission destination. The scanner unit scans a script of a transmission target so as to generate image data of the script. The addition unit generates a command for transmitting the image data to the transmission destination by using the obtained transmission destination information, converts each character constituting the command into a binary number, and adds, to the image data, dot data represented by a dot that corresponds to the binary number. The transmission unit transmits the image data to which the dot data has been added, to the relay device via fax communication.

A relay device according to an aspect of the embodiments includes an obtainment unit, an analysis unit, and a transmission unit. The obtainment unit obtains image data to which dot data represented by a dot corresponding to a binary number has been added. The analysis unit obtains the dot data from the image data, converts the dot data represented by the binary number into a character corresponding to the binary number, and analyzes a command represented by a character string formed by the characters. The transmission unit transmits the image data to a transmission destination specified by the command by a transmission method represented by the command as a result of the analysis of the command.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A-3D illustrate procedures of the present embodiment followed between the generation of a command character string and the embedment in image data to be transmitted via fax;

FIG. 6A and FIG. 6B explain commands used in the present embodiment;

FIG. 9 illustrates a configuration example of a transfer device according to the present embodiment;

FIG. 11 illustrates an example of a process flow of a command process unit according to the present embodiment.

DESCRIPTION OF EMBODIMENTS

According to the above first technique, when a script in which a barcode is embedded is displayed or printed, the existence of the barcode, i.e., the existence of information added to the script, is easily recognized by human beings. The information on a barcode can be read by a barcode reader included in a mobile device or the like, leading to a security problem wherein the telephone number or the address information of the transmission destination is leaked from a script.

Also, according to the above second technique, the header information of a received electronic mail is converted into a barcode and printed on printed matter in a superposition manner so that the header information is restored when the printed matter is read by an image reading device, and security is not taken into consideration.

In view of the above problems, according to an aspect of the present invention, a technique is provided which reduces a risk that information of a transmission destination will be leaked from a script to be transmitted.

Figure 1:
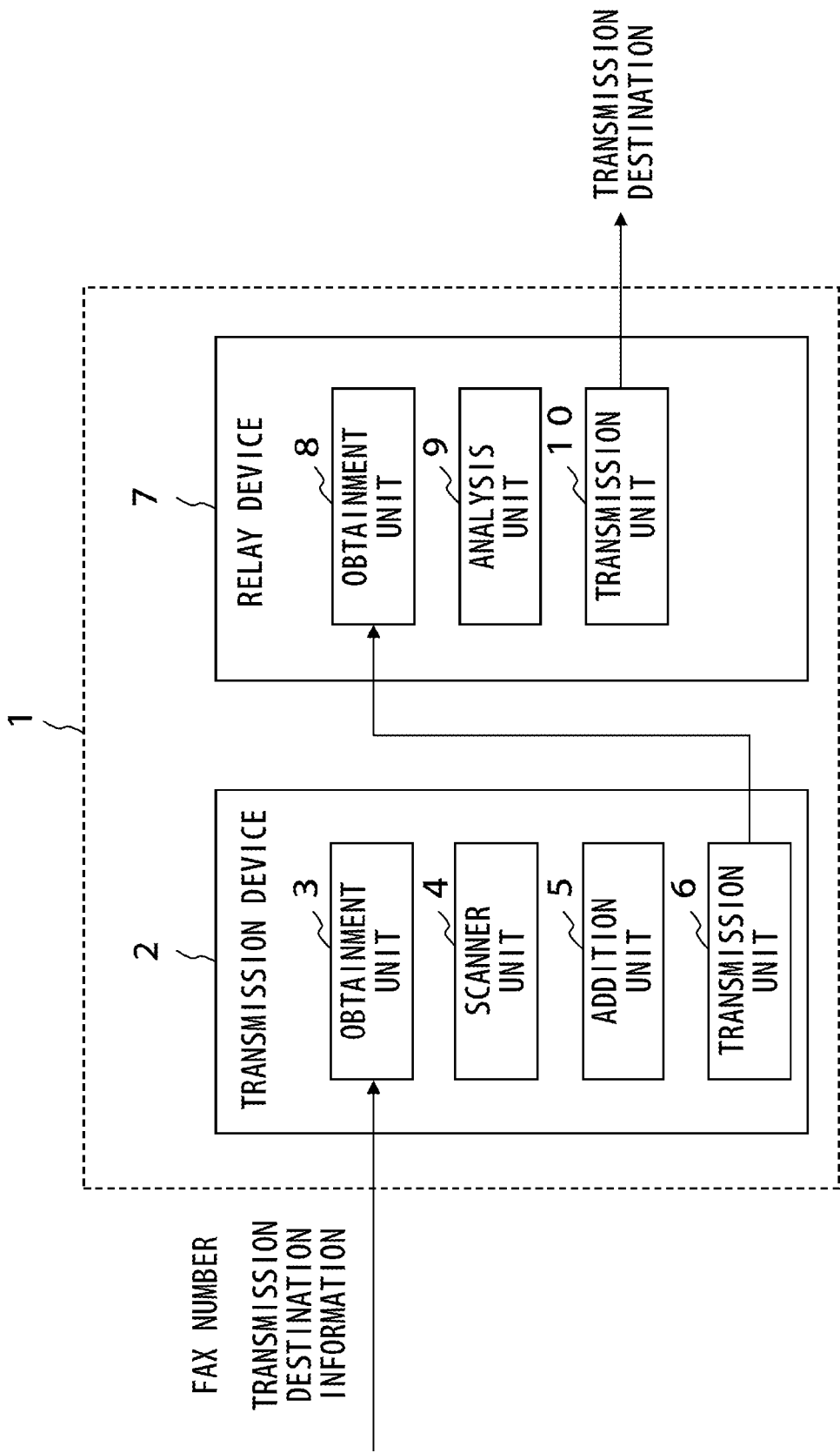
FIG. 1 illustrates a transmission system according to the present embodiment.

FIG. 1 illustrates a transmission system according to the present embodiment. A transmission system 1 includes a transmission device 2 and a relay device 7. The transmission device 2 includes an obtainment unit 3, a scanner unit 4, an addition unit 5, and a transmission unit 6. The obtainment unit 3 obtains the fax number of the relay device 7 and transmission destination information for specifying a transmission destination. An example of the obtainment unit 3 is a manipulation unit 22.

The scanner unit 4 generates image data of a script by scanning the script as a transmission target. An example of the scanner unit 4 is a scanner unit 21.

The addition unit 5 generates a command for transmitting image data to a transmission destination by using obtained transmission information, converts each character that constitutes the command into a binary number, and adds, to the image data, dot data, which is represented by dots corresponding to the binary numbers. The addition unit 5 adds the dot data to the top of the image data. An example of the addition unit 5 is a command embedment unit 24.

The transmission unit 6 transmits the image data to which the dot data has been added, to the relay device 7 via fax communication. An example of the transmission unit 6 is a fax transmission unit 26.

This configuration makes it possible to embed dots that represent transmission destination information and dots that are too small to be read easily, leading to the prevention of the leakage of the information of a transmission destination from a script to be transmitted. Also, a space of for example several square centimeters for embedding a barcode in script data for fax transmission is not necessary, improving the degree of freedom in the designing of scripts.

The relay device 7 includes an obtainment unit 8, an analysis unit 9, and a transmission unit 10. The obtainment unit 8 obtains image data to which dot data represented by dots corresponding to binary numbers has been added. An example of the obtainment unit 8 is a fax reception unit 30.

The analysis unit 9 obtains dot data from image data, converts dot data represented by binary numbers into characters corresponding to the binary numbers, and analyzes the command represented by the character string formed by the characters. An example of the analysis unit 9 is a command process unit 27.

The transmission unit 10 transmits image data to a transmission destination specified by a command on the basis of a transmission method represented by a command that has been analyzed. An example of the transmission unit 10 is a fax transmission unit 31.

When the result of analysis of a command indicates that the command is a request for transmission through fax communication, the transmission unit 10 transmits image data to a transmission destination specified by the command through fax communication. When the result of analysis of a command indicates that the command is a request for transmission through an electronic mail, the transmission unit 10 transmits the image data to a transmission destination specified by the command through an electronic mail.

By the above configuration, it is possible to analyze a command represented by dots and to transmit image data to a transmission destination specified by a transmission method of the analyzed command.

The present embodiment will be explained in detail hereinafter.

Figure 2:
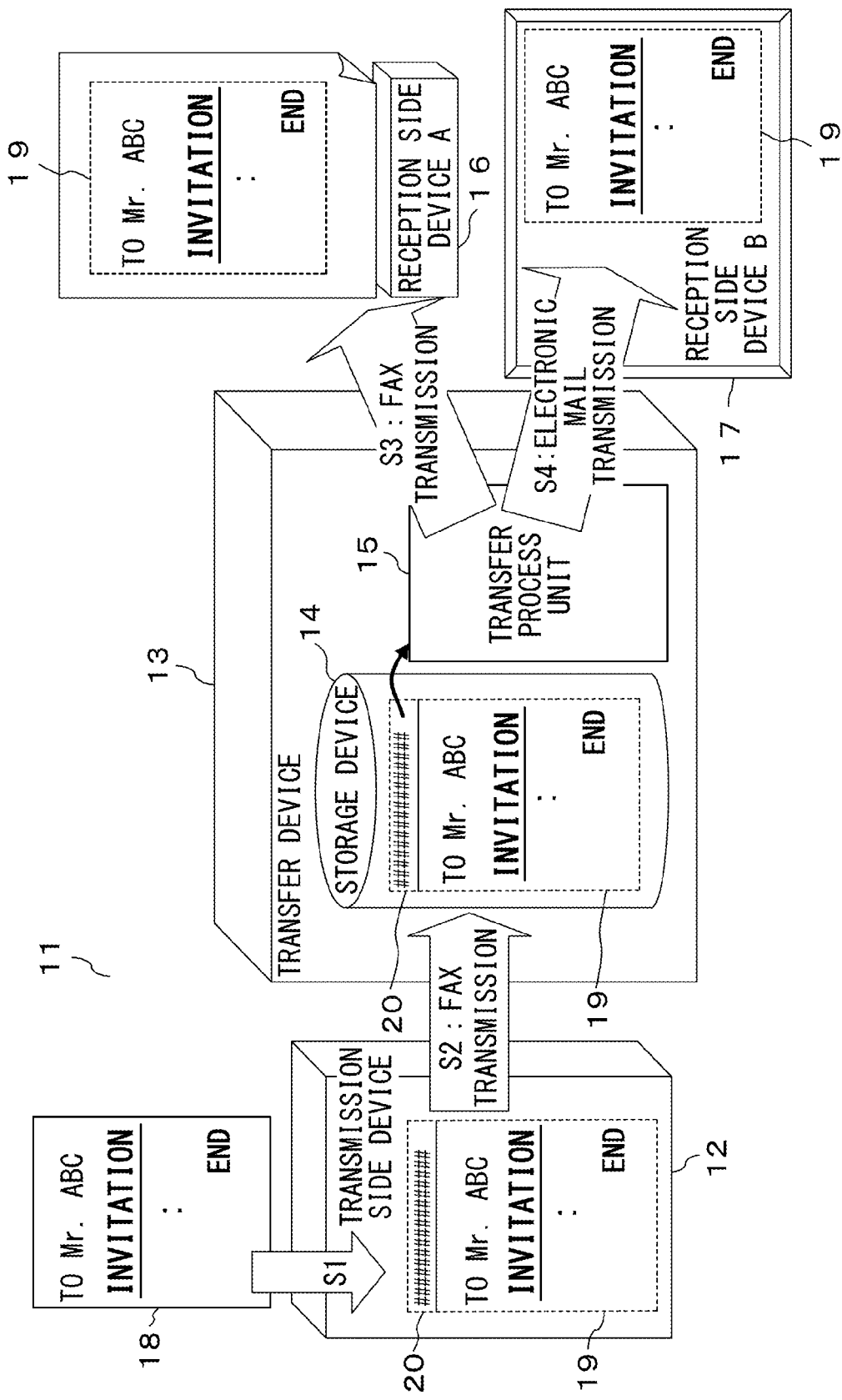
FIG. 2 illustrates processes of a fax output destination control system according to the present embodiment.

FIG. 2 illustrates processes of a fax output destination control system according to the present embodiment. A fax output destination control system 11 includes a transmission side device 12 such as a fax device or the like, a transfer device 13 and reception side device A (16) such as a fax device or the like or reception side device B (17) such as a PC or the like. The transfer device 13 includes a storage device 14 and a transfer control unit 15.

On the transmission side, a manipulator sets a script 18 on the tray of the transmission side device 12. Thereafter, the manipulator uses the manipulation panel of the transmission side device 12 so as to specify a transmission destination in the form of a fax number or an electronic mail address.

Then, the transmission side device 12 scans the script 18 so as to read it, and converts it into image data. The transmission side device 12 generates a command in which the input transmission destination corresponds to the fax number or electronic mail address, and embeds a command 20 in image data 19 (S1).

The manipulator uses the manipulation panel of the transmission side device 12 so as to input the fax number of the transfer device 13, and transmits, to the transfer device 13 via fax communication, the image data 19 in which the command 20 has been embedded (S2).

The transfer device 13 receives the image data 19 transmitted from the transmission side device 12, and stores it in the storage device 14. The transfer control unit 15 reads the image data 19 from the storage device 14 and analyzes the command 20 embedded in the image data 19. The transfer control unit 15 transmits the data to the transmission destination specified by the content of the analyzed command 20 in the specified transmission method.

When the result of the analysis indicates that the command 20 is a request for transmission of the image data 19 to the transmission destination through fax communication, the transfer control unit 15 transmits image data 19 in which the command 20 has been embedded to reception side device A (16), which is the transmission destination, through fax communication (S3). For this, the transfer device 13 may transmit the image data 19 from which the embedded command 20 has been removed. When receiving the image data transmitted from the transfer device 13, reception side device A (16) outputs the image data to a paper sheet or a display device.

When the result of the analysis indicates that the command 20 is a request for transmission of the image data 19 to the transmission destination through an electronic mail, the transfer control unit 15 transmits the image data 19 to reception side device B (17), which is the transmission destination (S4). For this, the transfer device 13 may transmit image data from which the embedded command has been removed. When receiving the electronic mail to which the image data has been attached, reception side device B (17) can view the image data 20 by using software for viewing electronic mails.

Hereinbelow, detailed explanations will be given for an output destination control method in which a command that can specify an output method is embedded in image data to be transmitted using a fax protocol. First, G3-fax protocol will be explained. The G3-fax protocol is an international fax standard, standardized by ITU-TS, and is used for analog telephone lines. The communication procedures according to the G3-fax protocol are as below.

(i) A communication route is connected from the transmission side to the reception side (make a telephone call)
(ii) The reception side reports its capacity to the transmission side, and the transmission side determines the sheet width (A4/B4/A3) and the compression method (MH/MR/MMR)
(iii) The transmission side converts the image data of the first page into a binary bitmap image of a prescribed width
(iv) The transmission side compresses the image data and transmits it to the reception side
(v) The reception side decodes the received data and restores/outputs the image data
(vi) When (iii) through (v) have been repeated for all pages, the communication route is disconnected According to the present embodiment, focus is given to the fact that a bitmap image data (also referred to as bitmap) whose least width is assured is generated by performing (iii) and (v). A bitmap is binary digital information, and eight consecutive bits can be processed as one-bit data. Accordingly, the present embodiment treats data in an area of a portion of a bitmap as a command code so as to utilize this data as an interface between transfer devices.

For example, when the first line of image data is treated as this command area (referred to as a command line), a code area of 1728 bits/8=216 bytes is generated because the A4 size of a G3-fax has 1728 pixels in the width direction as a fixed value regardless of the directions of the output. When an electronic mail address is set in this area according to the ASCII character code, it is possible to transmit an electronic mail without preparing beforehand a correspondence table between fax numbers and electronic mail addresses. Also, when a folder name is set, a storage destination of image data can be specified.

Influences by the command on the designing of scripts are that a command string is in the data size of for example around 30 through 50 bytes when electronic mail address has been specified. This data size only occupies the area of a one-pixel-width line at the upper end of the image data over the length of 15 through 20 percent of the sheet width.

By referring to FIGS. 3A-3D, explanation will be given for a case where an electronic mail address has been input as a transmission destination by using the manipulation panel of the transmission side device 12.

FIGS. 3A-3D and FIG. 4 illustrate procedures of the present embodiment followed between the generation of a command character string and the embedment in image data to be transmitted via fax. When electronic mail address "abc@xx.yy.zz" has been input as a transmission destination by using the manipulation panel of the transmission side device 12, the transmission side device 12, as illustrated in FIG. 3A, generates command string "Forward to e-mail: abc@xx.yy.zz". "Forward to e-mail" herein means "transmission with an image attached to a mail". The following character string "abc@xx.yy.zz" is the electronic mail address.

The transmission side device 12 converts the respective characters constituting command string "Forward to e-mail: abc@xx.yy.zz" into hexadecimal codes (such as Shift-JIS). Then, as illustrated in FIG. 3B, "0x46, 0x6F, 0x72, 0x77, 0x61, 0x72, 0x64, 0x20, 0x74, 0x6F, 0x20, 0x65, 0x2D, 0x6D, 0x61, 0x69, 0x6C, 0x3A, 0x61, 0x62, 0x63, 0x40, 0x78, 0x78, 0x2E, 0x79, 0x79, 0x2E, 0x7A, 0x7A" is obtained. FIG. 3C illustrates the dot expressions of these hexadecimal code expressions.

As illustrated in FIG. 3C, character "F" is "0x46" in hexadecimal code, is "01000110" in binary, and is "○●○○○●●○" in a dot expression. As described above, the dot expressions and the binary expressions correspond to each other.

When the command character string is printed, the dot expressions in FIG. 3C become one horizontal line as illustrated in FIG. 3D. A single horizontal dot expression of a command is referred to as a command line. Further, when ○ is replace with a blank and ● is replace with ■, it displays how the actual command line looks.

Figure 4:
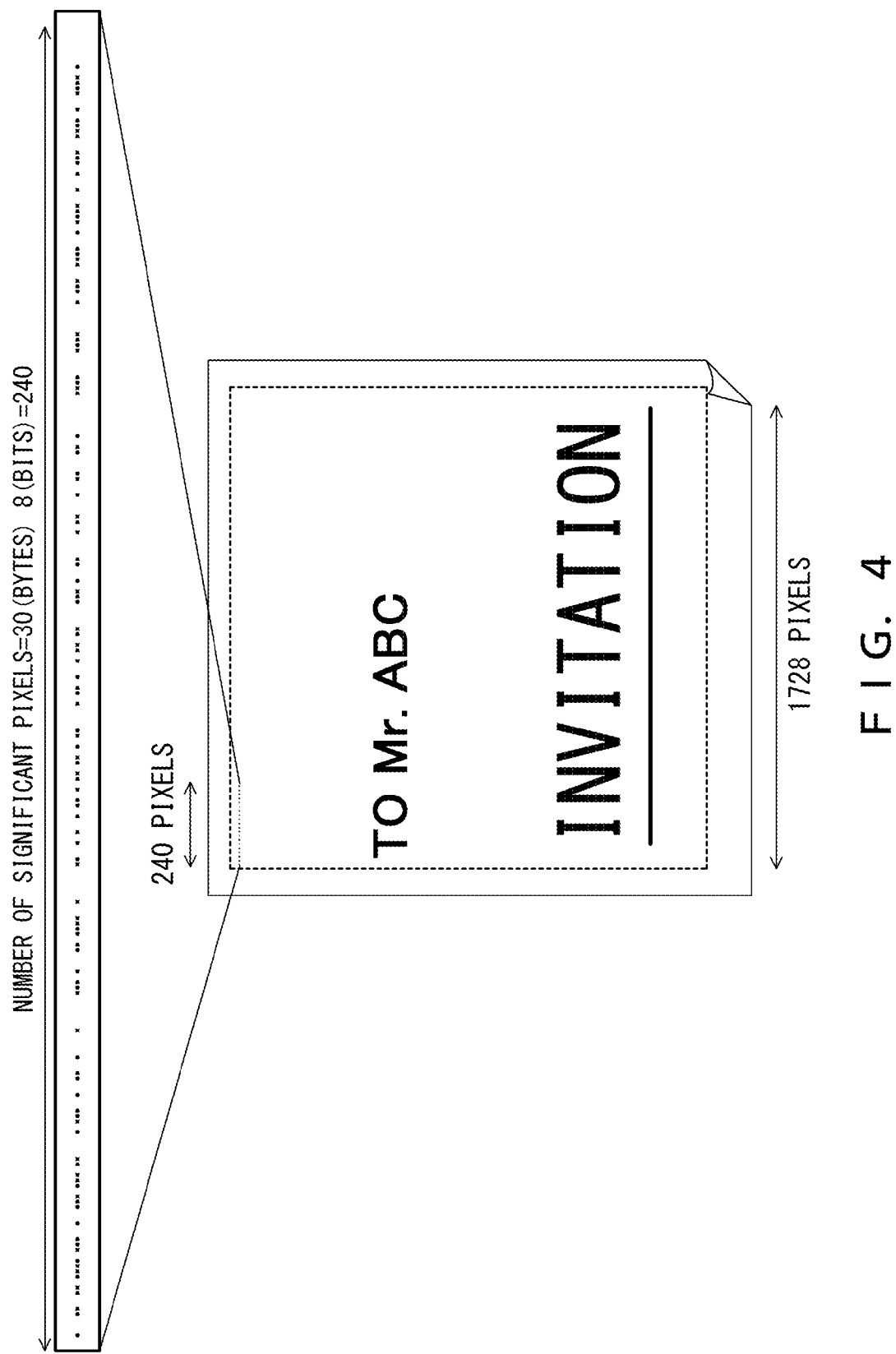
FIG. 4 illustrates procedures of the present embodiment followed between the generation of a command character string and the embedment in image data to be transmitted via fax.

FIG. 4 illustrates the result of embedding this command line in image data. In the case of an example of the above command, the size of the command line is represented by "the number of significant pixels=30[bytes]×8[bits]=240[pixels]". In this example, the size of the printed matter is 1728 [pixels], and accordingly the portion displaying the command line is very small with respect to the entire area of the printed matter and is not noticeable so much.

Because the longer a command character string is, the longer the command line is, a command line may occupy a plurality of lines in some cases.

Next, explanations will be given for an example of the fax output destination control system as an example of the present embodiment.

Figure 5:
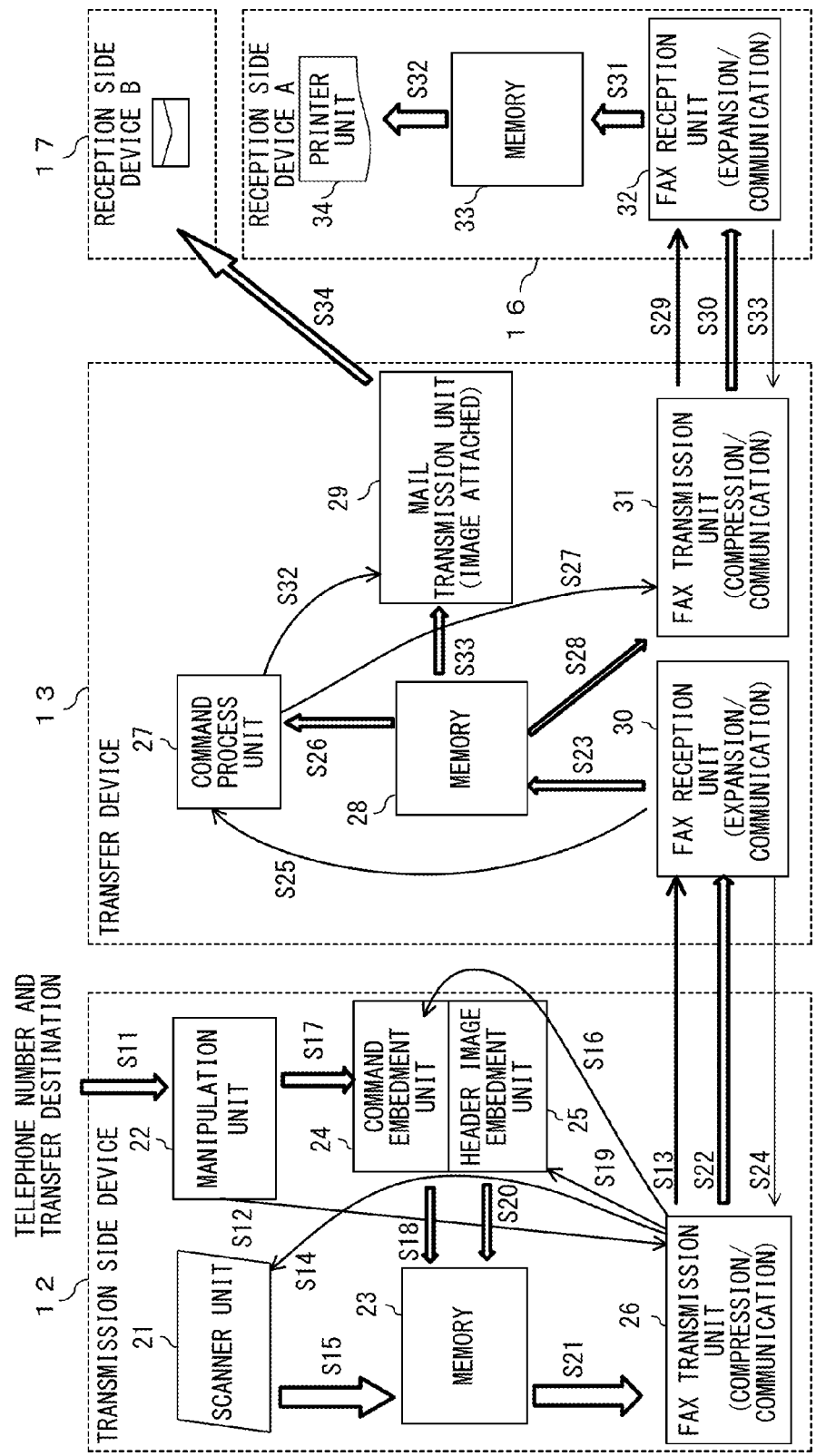
FIG. 5 illustrates an example of a fax output destination control system according to the present embodiment.

FIG. 5 illustrates an example of a fax output destination control system according to the present embodiment. The fax output destination control system 11 includes the transmission side device 12, the transfer device 13, and reception side devices A (16) and B (17). The transmission side device 12 is a device having a fax transmission function. The transfer device 13 transfers, through fax communication or electronic mail, image data received from the transmission side device 12 through fax communication. Reception side device A (16) is a device having a fax reception function. Reception side device B (17) is a device that can receive electronic mails. The transmission side device 12, the transfer device 13, and reception side device A (16) are connected in such a manner that fax transmission is possible through a public circuit network. The transfer device 13 and reception side device B (17) are connected through a communication circuit such as the Internet or the like.

A mechanism for implementing the present embodiment is configured by using an upon-transmission mechanism and an upon-reception mechanism. The upon-transmission mechanism is for embedding the command line and the upon-reception mechanism is for analyzing and processing the above command line. It is not necessary to include both of these mechanisms, and for example when the device is a reception-dedicated device, the upon-reception mechanism alone may be included.

The transmission side device 12 includes the scanner unit 21, the manipulation unit 22, a memory 23, the command embedment unit 24, a header image embedment unit 25, and a fax transmission unit 26. The manipulation unit 22 is a manipulation panel that permits key inputs, etc. A manipulator sets a script to be fax transmitted on the tray of the transmission side device 12. Then, the manipulator uses the manipulation unit 22 so as to specify the telephone number (for example 03-xxxx-xxxx) of the transfer device 13 and a transmission destination, and activates the fax transmission function (S11 and S12). In other words, the activation of transmission begins with the input of the telephone number of the transfer service and the mail address or fax number of the transmission destination through the manipulation unit 22 of the transmission side device 12. In an example, manual input through the manipulation unit 22 is described; however, these inputs may be performed by means of a program. When the transmission function has been activated, the manipulation unit 22 issues, to the fax transmission unit 26, a fax transmission request directed to the destination of the input telephone number.

The fax transmission unit 26 dials the telephone number so as to call the transfer device 13, which is the counterpart side (S13). The transfer device 13 makes a response as a fax device, and accordingly the fax transmission unit 26 gives, to the scanner unit 21, an instruction to read the script (S14).

The scanner unit 21 reads a script set on a tray as a fax transmission target, and converts it into image data in accordance with the reading instruction. The scanner unit 21 sequentially writes pieces of the read information as image information in the memory 23 (S15).

When the writing to the memory 23 is completed, the fax transmission unit 26 gives an instruction to embed the command to the command embedment unit 24, which is an upon-transmission mechanism (S16). The command embedment unit 24 obtains information of the input transfer destination from the manipulation unit 22 (S17), and adds a prescribed command character to the transfer destination information so as to generate a command character string. Further, the command embedment unit 24 converts the generated command character string into binary numbers so as to generate dot data corresponding to the binary numbers. This will be explained by referring to FIG. 6A and FIG. 6B.

Thereafter, the command embedment unit 24 writes the generated dot data from the top of the memory 23 (S18). When a script image exists in the area to which the dot data is written, the command embedment unit 24 deletes the script image and writes the dot data. This operation deletes the information of the original script; however, it is not problematic because the script information is not arranged in the top area of the bitmap. The reason for this is that the top area of the bitmap is used as the header image area and the information of the script is arranged in the center area of the bitmap with margins in order to enhance the utility of a fax. A header image is a result of converting the date and time of transmission, the telephone number of the device itself (transmission side device), a page number, or the like, and the upper edge area of this bitmap is not used usually.

The fax transmission unit 26 gives to the header image embedment unit 25 an instruction to embed the above header image (S19). The header image embedment unit 25 embeds the header image in the header portion of the bitmap stored in the memory 23 (S20). Thereby, the bitmap data to be transmitted is completed. Note that while the script image, the command (dot data), and the header image are written to a bitmap in this order in this example, arbitrary orders may be employed as long as a target bitmap is completed, or they may be written simultaneously.

Next, the fax transmission unit 26 converts the bitmap data in the memory 23 into compressed data defined by the fax protocol, and transmits the data to the fax reception unit 30 of the transfer device 13 (S21, and S22). The fax reception unit 30 expands the compressed that has been received, writes the entirety of the data to a memory 28 (S23), and returns a response of reception completion to the transmission side. Thereafter, the fax transmission procedures are terminated.

From this moment, operations are performed by the transfer device 13. The transfer device 13 includes the command process unit 27, the memory 28, a mail transmission unit 29, the fax reception unit 30, and the fax transmission unit 31.

The fax reception unit 30 gives an instruction of a command process to the command process unit 27, which is an upon-reception mechanism (S25). The command process unit 27 reads data from the top of the memory 28 (S26), and analyzes a prescribed character string (command characters).

When the command process unit 27 has determined that the result of the command analysis indicates a fax transmission instruction, the command process unit 27 treats the command parameter as a fax number, and extracts it, and makes a fax transmission request to the fax transmission unit 31 (S27).

The fax transmission unit 31 converts the bitmap data in the memory 28 into compressed data defined by the fax protocol in accordance with the fax transmission instruction (S28). The fax transmission unit 31 dials to a transfer destination specified by the fax number and calls reception side device A (16), which is the counterpart side (S29). Reception side device A (16) represents a response as a fax device, and accordingly the fax transmission unit 31 transmits to the compressed data a fax reception unit 32 of reception side device A (16) (S30).

The fax reception unit 32 expands the received compressed data and writes the entire data to a memory 33 (S31). A print unit 34 reads the bitmap data stored in the memory 33, and prints it on a paper sheet. The fax reception unit 32 returns a response of reception completion, and the fax transmission procedures are terminated (S33).

When the command process unit 27 has determined that the result of the command analysis indicates an electronic mail transmission instruction, the command process unit 27 treats the command parameter as an electronic mail address, extracts it, and makes an electronic mail transmission request to the mail transmission unit 29 (S32). The mail transmission unit 29 reads the bitmap data stored in the memory 28 (S33), attaches the bitmap data to an electronic mail, and transmits it to reception side device B (17) as a transfer destination specified by the electronic mail address (S34).

Also, when the result of the analysis indicates that the command character does not correspond to any command, the command process unit 27 performs an "exception process".

In the transfer device 13 according to the present example, it is assumed that a fixed output destination such as a printer or the like does not exist in the transfer device 13 and the specification of a transfer destination is necessary, and accordingly the exception process performs an error process. In other words, the transfer device 13 outputs an error factor to a prepared log function, and thereafter deletes the received data.

Accordingly, when a fixed output destination exists, the command process unit 27 does not have to perform the "exception process" as an error process and may output data as it is by ignoring the top data in the memory 28. This suggests a case where an upon-reception mechanism is implemented in a fax device or the like. Methods of defining or analyzing commands are not limited in the present embodiment.

FIG. 6A and FIG. 6B explain commands used in the present embodiment. As illustrated in FIG. 6A, a command character string is defined as a string resulting from coupling two character strings as follows. Also, the character code constituting each character string is assumed to be Shift-JIS. The command type is a fixed character string that is defined beforehand. A command parameter is treated as one character string until a blank emerges.

Command characters representing command types are defined as illustrated in FIG. 6B. In other words, "Forward to e-mail:" means transmission of a script via electronic mail using the command parameter as the electronic mail address. In a command parameter, a plurality of electronic mail addresses may be set.

"Forward to fax:" means transmission of a script via fax transmission by using the command parameter as the fax number. In a command parameter, a plurality of fax numbers may be set.

Explanations will be given for a case where a command string, for example "Forward to e-mail:abc@xx.yy.zz", is developed to a bitmap by using the above command.

Figure 7:
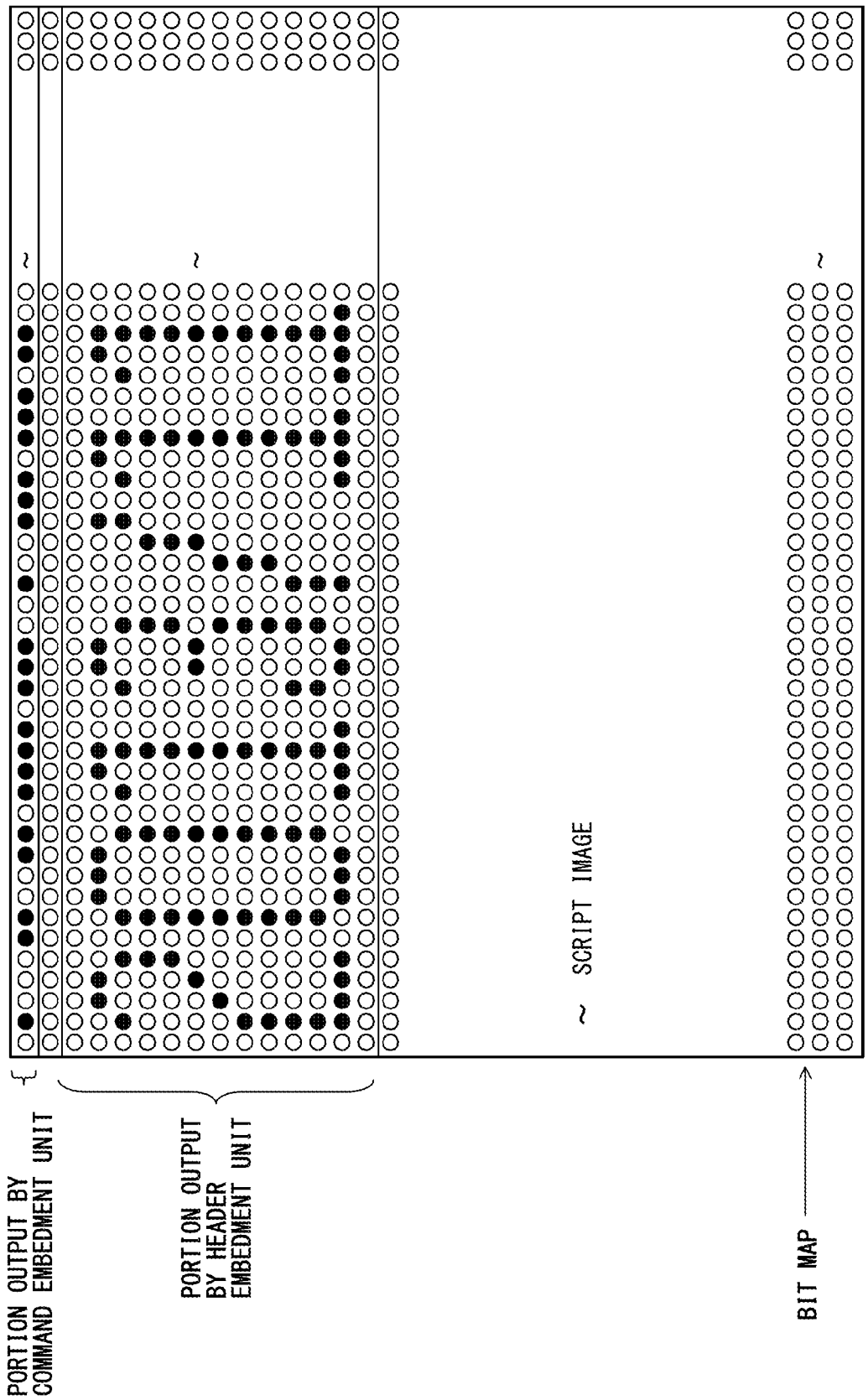
FIG. 7 illustrates an example in which a header image and a command have been embedded in bitmap data according to the present embodiment.

FIG. 7 illustrates an example in which a header image and a command have been embedded in a bitmap data according to the present embodiment. As explained in S18 in FIG. 5, the command embedment unit 24 writes a generated command character string from the top of the memory 23. Also, as explained in S20 in FIG. 5, the header image embedment unit 25 embeds a header image such as the date and time of transmission, the telephone number of the station itself (transmission side device), a page number, or the like.

Note that a method may be used that specifies whether the transmission method is fax transmission or electronic mail transmission by the type of a command as illustrated in FIG. 6B.

Also, as another determination method of transmission methods, a method may be used that determines a parameter to be a fax number (fax transmission) when the parameter only includes numbers or symbols other than "@" and that determines a parameter to be a mail address (mail transmission) when the parameter is a character string having the format of an e-mail address, which includes "@", by using a command in common. It is a method in which for example "123-4567#890" is a fax number, "123@4567.JP" is an electronic mail address, and "abc-4567" is neither the fax number nor the electronic mail address so that "exception process" is assigned.

Figure 8:
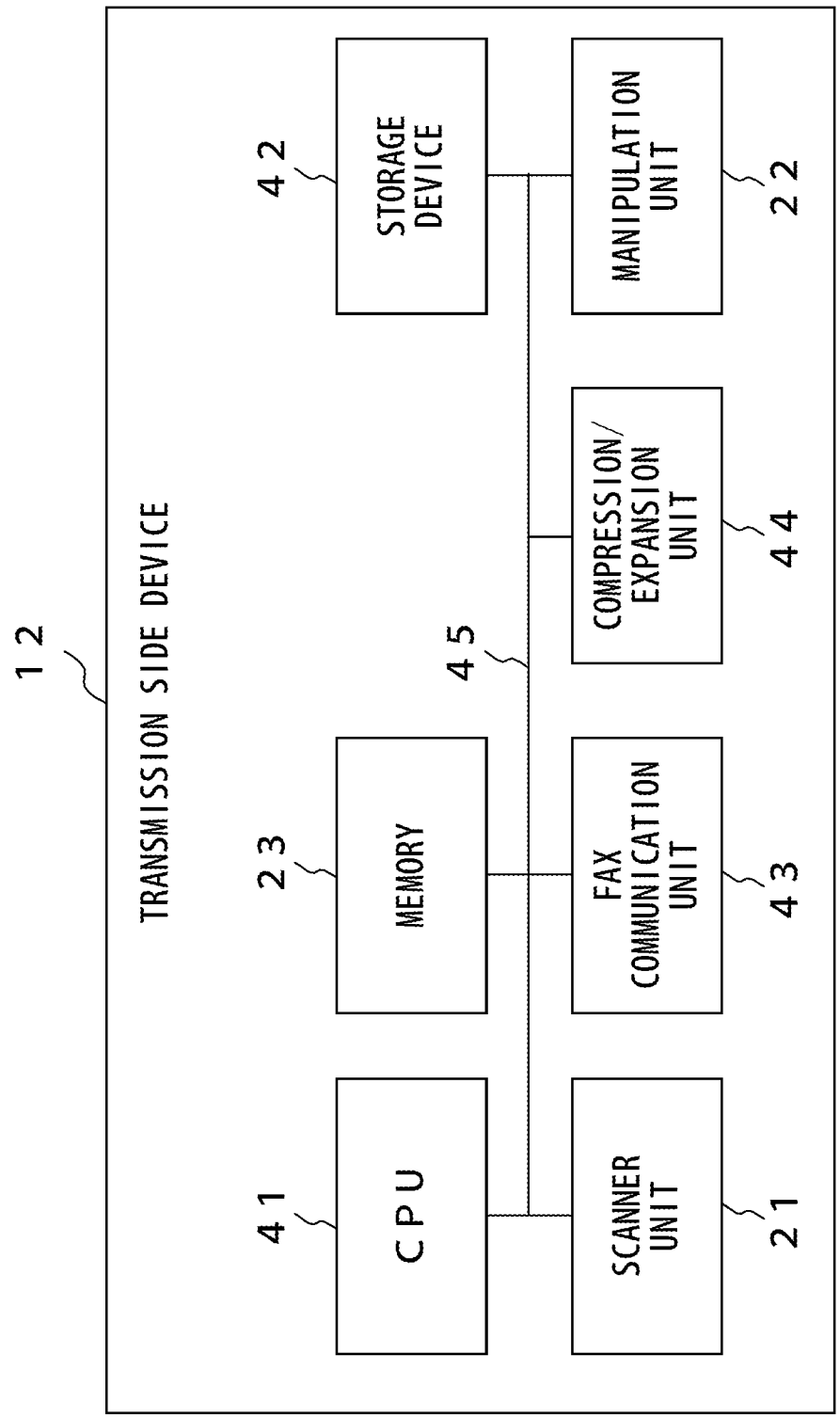
FIG. 8 illustrates a configuration example of a transmission side device according to the present embodiment.

FIG. 8 illustrates a configuration example of a transmission side device according to the present embodiment. The transmission side device 12 includes a central processing unit (CPU) 41, the memory 23, a storage device 42, the scanner unit 21, a fax communication unit 43, a compression/expansion unit 44, the manipulation unit 22, and a system bus 45. The central processing unit (CPU) 41, the memory 23, the storage device 42, the scanner unit 21, the fax communication unit 43, the compression/expansion unit 44, and the manipulation unit 22 are connected to each other through the system bus 45. The transmission side device 12 may further include a printer unit.

The memory 23 includes bitmap data as described above. The storage device 42 is a general name for storage devices such as a ROM (Read Only Memory) for storing a program and data, a RAM (Random Access Memory) for holding data temporarily, and others.

The CPU 41 controls the entire transmission side device 12. Also, the CPU 41 executes a program read by the storage device 42 so as to function as the command embedment unit 24, the header image embedment unit 25, and (part of the function of) the fax transmission unit 26.

The scanner unit 21 uses for example a CCD (Charge Coupled Device) so as to scan a script as a fax transmission target and generate bitmap data. The manipulation unit 22 is a manipulation panel that represents information related to fax transmission and reception and that is used by users for performing various settings and inputting of data. The manipulation unit 22 includes a display unit and an input unit. The display unit represents various types of information or the telephone number of a destination, and is for example a liquid crystal panel. Also, the input unit is for example a numerical keyboard, or the like.

The compression/expansion unit 44 compresses/encodes the bitmap data read by the scanner unit 21 and expands compressed/encoded data received from an external environment. It is also possible to employ a configuration in which the process performed by the compression/expansion unit 44 is programmed so that the CPU 41 reads the program and functions as the compression/expansion unit.

The fax communication unit 43 includes an NCU (Network Control Unit), a modem, or the like. An NCU is a device to be connected to a telephone line and performs control of sending a dial signal to a telephone number or control of making the telephone enter an off hook state when there is a call. A modem (fax modem) is for implementing the modem function of the communication protocol (G3 or the like) of the fax device.

FIG. 9 illustrates a configuration example of a transfer device according to the present embodiment. The transfer device 13 includes a CPU 51, the memory 28, a storage device 52, a fax communication unit 53, a compression/expansion unit 54, a communication unit 55, and a system bus 56. The CPU 51, the memory 28, the storage device 52, the fax communication unit 53, the compression/expansion unit 54, and the communication unit 55 are connected to each other through the system bus 56.

As described above, the memory 28 stores bitmap data. The storage device 52 is a general name of storage devices such as a ROM (Read Only Memory) for storing a program and data, a RAM (Random Access Memory) for holding data temporarily, and others.

The CPU 51 controls the entire transfer device 13. Also, the CPU 51 executes a program read by the storage device 52 so as to function as the command process unit 27, (part of the function of) the mail transmission unit 29, (part of the function of) of the fax reception unit 30, and (part of the function of) of the fax transmission unit 31.

The fax communication unit 53 includes an NCU (Network Control Unit), a modem, or the like. An NCU is a device to be connected to a telephone line and performs control of sending a dial signal to a telephone number or control of making the telephone enter an off hook state when there is a call. A modem (fax modem) is for implementing the modem function of the communication protocol (G3 or the like) of the fax device.

The compression/expansion unit 54 compresses and encodes the bitmap data and expands compressed/encoded data received from an external environment. It is also possible to employ a configuration in which the process performed by the compression/expansion unit 54 is programmed so that the CPU 51 reads the program and functions as the compression/expansion unit.

The communication unit 55 is an interface for performing communications with an external environment through a communication network such as the Internet, a LAN (Local Area Network), or the like.

A program that implements the processes of the transmission side device 12 or the transfer device 13 explained in the above embodiments may be stored in for example the storage device 42 or 52 by a program provider side through a communication network. Also, a program that implements the processes explained in the above embodiments may be stored in a portable storage medium that is commercially available. In such a case, that portable storage medium may be set in a reading device (not illustrated) of the transmission side device or the transfer device so that the program is read and executed by the CPU 41 or 51. As the portable storage medium, various types of storage media such as a CD-ROM, a flexible disk, an optical disk, a magneto-optical disk, an IC card, a USB memory device, etc., may be used. Also, the transmission side device 12 and the transfer device 13 may be computers.

Figure 10:
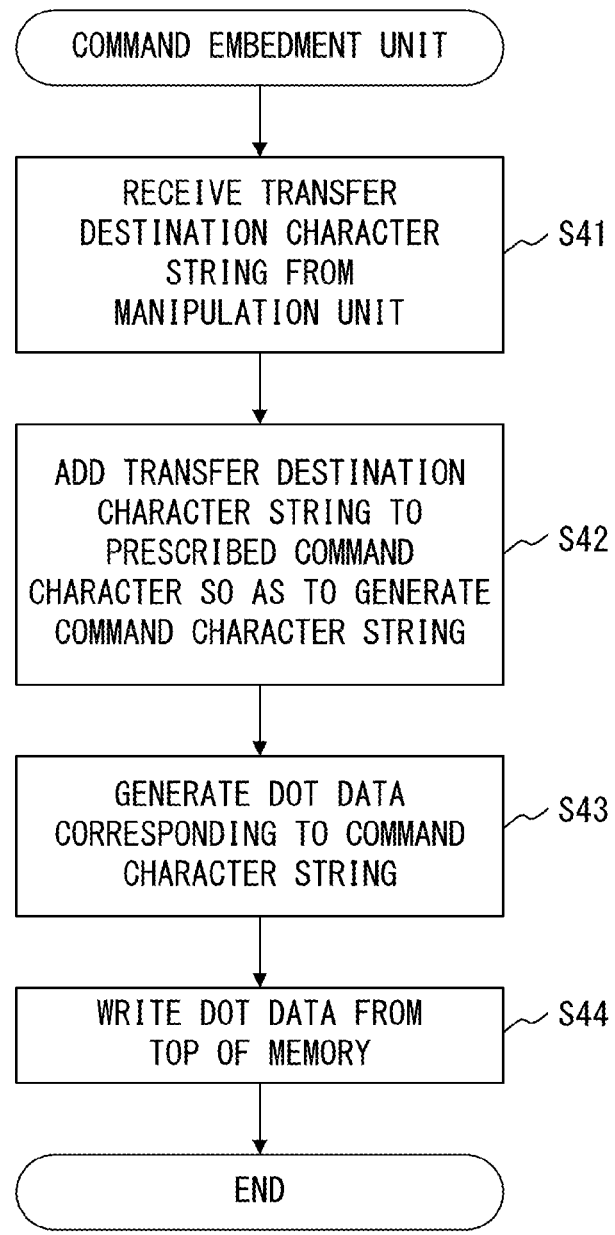
FIG. 10 illustrates an example of a process flow of a command embedment unit according to the present embodiment.

FIG. 10 illustrates an example of a process flow of a command embedment unit according to the present embodiment. The flow illustrated in FIG. 10 corresponds to the processes in S17 through S18 in FIG. 5. As described above, the CPU 41 executes a program read by the storage device 42, and thereby functions as the command embedment unit 24.

In S15 in FIG. 5, when the writing of bitmap data to the memory 23 has been completed, the CPU 41 receives a transfer destination character string (command parameter) from the manipulation unit 22 (S41). In this example, a transfer destination character string (command parameter) is character code data representing a mail address or a telephone number (fax number).

The CPU 41 adds the received transfer destination character string to a prescribed command character so as to generate a command character string (S42) as explained by referring to FIG. 6A and FIG. 6B (S42). The CPU 41 converts each character (hexadecimal code) that constitutes the generated command character string into a binary code, and generates dot data corresponding to the binary code (S43). The CPU 41 writes that dot data from the top of the memory 23 (S44). Dot data may be data obtained by converting an encrypted command character string into binary data. For example, the CPU 41 may encrypt a generated command character string so as to generate dot data from that encrypted command character string.

FIG. 11 illustrates an example of a process flow performed by the command process unit according to the present embodiment. The flow in FIG. 11 corresponds to the processes in S26 through S27 and S32 in FIG. 5. As described above, the CPU 51 executes a program read from the storage device 52, and thereby functions as the command process unit 27.

When a response of reception completion is returned to the transmission side in S24 in FIG. 5, the CPU 51 reads bitmap data from the top of the memory 28 so as to determine whether it is dot data. When the CPU 51 has determined that dot data exists, it holds character codes corresponding to the dot data sequentially in a RAM or the like (S51).

When all pieces of dot data have been read, the CPU 51 reads a character string held in a RAM, and determines whether the character string is an existing character string (command characters). When the character string is a prescribed command character, the CPU 51 analyzes the command character (S52).

When the CPU 51 has determined that the command characters indicate a fax transmission request as a result of the command analysis (S53), it treats a command parameter read sequentially to the command characters as a fax number, extracts it, and performs a fax transmission process (S56). In the fax transmission process, the CPU 51 compresses and encodes the bitmap data read from the memory 23 in the compression/expansion unit 54. The CPU 51 dials the extracted fax number via the fax communication unit 53, and transmits the compressed/encoded data to reception side device A (16).

When the CPU 51 has determined that the command characters indicate an electronic mail transmission request as a result of the command analysis (S53), it treats a command parameter read sequentially to the command characters as an electronic mail address, extracts it, and performs an electronic mail transmission process (S55). In the electronic mail transmission process, the CPU 51 transmits an electronic mail to which the bitmap data read from the memory 23 has been attached, to the extracted electronic mail address via the communication unit 54.

When the CPU 51 has determined that the character string is not an existing character string or when the CPU 51 has determined that the command characters are not a fax transmission request or an electronic mail transmission request, i.e., when it has determined the character string to be an exceptional process as a result of the command analysis (S53), the CPU 51 executes an error process. In this example, the CPU 51 writes an error factor in a log file existing in a system, and deletes the bitmap data from the memory 28 (S54). When the character string represents a file output request as an exceptional process, the CPU 51 may output the received bitmap data as file data (for example in a JPEG format or a PDF format) to the storage device 52. Upon doing this, the CPU 51 may treat a command parameter read subsequently to the command character as the path of the file output destination and a file format and extract them so as to output the received bitmap data to that output destination in the file format.

According to the present embodiment, a command and information of a transmission destination are embedded in the top portion of bitmap image data as dot data corresponding to the binary data and are transmitted by means of fax. Thereafter, when the image data is output on the reception side, that dot data is printed in a pixel order size at the periphery of a print sheet. Accordingly, unlike a barcode or a QR code, it is not read by an image reading device easily. As described above, it is possible to control a transmission destination or the like using a method that is safe in comparison with a method that controls a transmission destination by means of a barcode, which can be read easily. Also, as additional effects of the present embodiment, dot data is not very noticeable and not very easy for humans to read as a barcode, leading to the following advantages.

Because space (several square centimeters) for embedding a barcode in is not necessary, there are no limitations on the designing of a script Because an image analysis process for detecting and reading the position of a barcode is not necessary, false recognition does not occur According to an aspect of the present invention, it is possible to reduce a risk of leaking information of a transmission destination from a script to be transmitted.

Also, in a device that does not include an upon-reception mechanism according to the present embodiment, command line portions are also treated as image data so as to be printed. Further, from the beginning, fax systems are designed to read/print handwritten script, while in the present embodiment, even when a meaningless and irregular line is printed, information transmission does not deteriorate and benefits due to the effects of the present embodiment are not reduced. Also, some fax devices are designed to not print the edge portion of a bit map, leading to a situation where dot data is not printed.

Note that the present invention is not limited to the above described embodiments, and various configurations or embodiments may be employed without departing from the spirit of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device comprising:
   an obtainment unit configured to obtain a fax number of a relay device and transmission destination information that determines a transmission destination;
   a scanner unit configured to scan a script of a transmission target so as to generate image data of the script; and
   a processor configured to execute a process including:
      generating a command for transmitting the image data to the transmission destination by using the obtained transmission destination information;
      converting each character constituting the command into a binary number;
      embedding, in an area of a portion of the image data, dot data of the command, the dot data being represented by a dot that corresponds to the binary number; and
      transmitting the image data in which the dot data has been embedded, to the relay device via fax communication.

2. The transmission device according to claim 1, wherein the embedding embeds the dot data in a top of the image data.

3. A relay device comprising:
   a memory; and
   a processor configured to execute a process including:
      obtaining image data in which dot data of a command has been embedded, the dot data being represented by a dot that corresponds to the binary number;
      obtaining the dot data of the command from the image data;
      converting the dot data that is the dot data of the command and is represented by the binary number into a character corresponding to the binary number;
      analyzing the command represented by a character string formed by the characters; and
      transmitting the image data to a transmission destination specified by the command by using a transmission method represented by the command as a result of the analysis of the command.

4. The relay device according to claim 3, wherein
   the transmitting transmits the image data to a transmission destination specified by the command via the fax transmission when a result of the analysis of the command indicates that the command is a request for transmission via fax communication, or transmits the image data to a transmission destination specified by the command via the electronic mail when a result of the analysis of the command indicates that the command is a request for transmission via an electronic mail.

5. A non-transitory computer-readable recording medium having stored therein a program for causing a computer to execute a process for transmitting data, the process comprising:
- obtaining a fax number of a relay device and transmission destination information that determines a transmission destination;
- scanning a script of a transmission target so as to generate image data of the script;
- generating a command for transmitting the image data to the transmission destination by using the obtained transmission destination information;
- converting each character constituting the command into a binary number;
- embedding, in an area of a portion of the image data, dot data of the command, the dot data being represented by a dot that corresponds to the binary number; and
- transmitting the image data in which the dot data has been embedded, to the relay device via fax communication.

6. The non-transitory computer-readable recording medium according to claim 5, wherein the embedding embeds the dot data in a top of the image data.

7. A non-transitory computer-readable recording medium having stored therein a program for causing a computer to execute a process for relaying data, the process comprising:
- obtaining image data in which dot data of a command has been embedded, the dot data being represented by a dot that corresponds to the binary number;
- obtaining the dot data of the command from the image data;
- converting the dot data that is the dot data of the command and is represented by the binary number into a character corresponding to the binary number;
- analyzing the command represented by a character string formed by the characters; and
- transmitting the image data to a transmission destination specified by the command by using a transmission method represented by the command as a result of the analysis of the command.

8. The non-transitory computer-readable recording medium according to claim 7, wherein
the transmitting transmits the image data to a transmission destination specified by the command via the fax transmission when a result of the analysis of the command indicates that the command is a request for transmission via fax communication, or transmits the image data to a transmission destination specified by the command via the electronic mail when a result of the analysis of the command indicates that the command is a request for transmission via an electronic mail.

9. A control method of a transmission system that transmits information from a transmission device to a transmission destination via a relay device, the control method comprising:
- obtaining, by using the transmission device, a fax number of the relay device and transmission destination information that determines a transmission destination;
- scanning, by using the transmission device, a script of a transmission target by using a manipulation unit so as to generate image data of the script;
- generating a command for transmitting the image data to the transmission destination by using the obtained transmission destination information;
- converting, by using the transmission device, each character constituting the command into a binary number;
- embedding, in an area of a portion of the image data, dot data of the command, the dot data being represented by a dot that corresponds to the binary number, by using the transmission device;
- transmitting, by using the transmission device, the image data in which the dot data has been embedded, to the relay device via fax communication;
- obtaining, by using the relay device, image data in which the dot data of a command has been embedded, the dot data being represented by a dot that corresponds to the binary number;
- obtaining, by using the relay device, the dot data of the command from the image data;
- converting, by using the relay device, the dot data that is the dot data of the command and is represented by the binary number into a character corresponding to the binary number;
- analyzing, by using the relay device, the command represented by a character string formed by the characters; and
- transmitting, by using the relay device, the image data to a transmission destination specified by the command by using a transmission method represented by the command as a result of the analysis of the command.

* * * * *